(12) United States Patent
Kanai et al.

(10) Patent No.: US 10,116,186 B2
(45) Date of Patent: Oct. 30, 2018

(54) BRUSHLESS WIPER MOTOR

(71) Applicant: Mitsuba Corporation, Gunma (JP)

(72) Inventors: Takeshi Kanai, Gunma (JP); Hiroto Tanaka, Gunma (JP); Tomohiko Annaka, Gunma (JP); Naoki Kojima, Gunma (JP); Hirokazu Shoda, Gunma (JP)

(73) Assignee: Mitsuba Corporation, Kiryu-shi, Gunma (JP)

(*) Notice: Subject to any disclaimer, the term of this patent is extended or adjusted under 35 U.S.C. 154(b) by 537 days.

(21) Appl. No.: 14/780,184

(22) PCT Filed: Mar. 26, 2014

(86) PCT No.: PCT/JP2014/058655
§ 371 (c)(1),
(2) Date: Sep. 25, 2015

(87) PCT Pub. No.: WO2014/157399
PCT Pub. Date: Oct. 2, 2014

(65) Prior Publication Data
US 2016/0056686 A1 Feb. 25, 2016

(30) Foreign Application Priority Data
Mar. 29, 2013 (JP) ................ 2013-072537

(51) Int. Cl.
*H02K 7/116* (2006.01)
*H02K 9/22* (2006.01)
(Continued)

(52) U.S. Cl.
CPC ............ *H02K 7/116* (2013.01); *B60S 1/166* (2013.01); *H02K 5/02* (2013.01); *H02K 5/16* (2013.01);
(Continued)

(58) Field of Classification Search
CPC . B60S 1/166; H02K 9/22; H02K 5/16; H02K 5/18; H02K 5/22; H02K 7/116;
(Continued)

(56) References Cited

U.S. PATENT DOCUMENTS 6,657,337 B1  12/2003  Delevallee
7,262,528 B2   8/2007  Amagasa
(Continued)

FOREIGN PATENT DOCUMENTS

CN   100394678 C   6/2008
DE      142775 A1   7/1980
(Continued)

OTHER PUBLICATIONS

Prior art JP 2010093977 A machine translation.*
(Continued)

*Primary Examiner* — Mohamad Musleh
(74) *Attorney, Agent, or Firm* — McCormick, Paulding & Huber LLP

(57) ABSTRACT

A motor case (31) in which a stationary portion (35) is fixed, and a gear case (41) in which a gear mechanism (SD) is accommodated are made of aluminium, most heat generated from the stationary portion (35) at the time of actuation of a brushless wiper motor (20) can be directly dissipated outside from the motor case (31). That is, compared with conventional technique, heat transmitted to the motor case (31) can be efficiently dissipated outside, and the motor case (31) does not reach high temperature. Therefore, as a matter of course, reduction in size and weight can be achieved, suppression of electromagnetic noise can be achieved, and heat-resistance strength can be enhanced. Expensive components capable of resisting high temperatures are not required, and reduction in manufacturing cost can be achieved.

4 Claims, 7 Drawing Sheets

(51) Int. Cl.
  *B60S 1/16* (2006.01)
  *H02K 5/02* (2006.01)
  *H02K 11/33* (2016.01)
  *H02K 5/16* (2006.01)
  *H02K 5/18* (2006.01)
  *H02K 5/22* (2006.01)
  *H02K 11/00* (2016.01)

(52) U.S. Cl.
  CPC ............. *H02K 5/18* (2013.01); *H02K 5/22* (2013.01); *H02K 7/1166* (2013.01); *H02K 9/22* (2013.01); *H02K 11/0073* (2013.01); *H02K 11/33* (2016.01); *H02K 2213/03* (2013.01)

(58) Field of Classification Search
  CPC .... H02K 11/0073; H02K 5/02; H02K 7/1166; H02K 11/33; H02K 2213/03
  See application file for complete search history.

(56) References Cited

U.S. PATENT DOCUMENTS

2001/0007401 A1    7/2001    Walther et al.
2005/0280323 A1   12/2005    Amagasa
2009/0266640 A1   10/2009    Oshima et al.

FOREIGN PATENT DOCUMENTS

| | | |
|---|---|---|
| EP | 1564870 B1 | 12/2008 |
| GB | 280635 A | 11/1927 |
| GB | 344451 A | 3/1931 |
| JP | H06-253496 A | 9/1994 |
| JP | 2004159392 A | 6/2004 |
| JP | 2004320879 A | 11/2004 |
| JP | 3685915 B2 | 8/2005 |
| JP | 2007181383 A | 7/2007 |
| JP | 2008238929 A | 10/2008 |
| JP | 2008252974 A | 10/2008 |
| JP | 2010-93977 A | 4/2010 |
| JP | 2010093977 A | 4/2010 |

OTHER PUBLICATIONS

International Search Report for PCT Serial No. PCT/JP2014/058655 dated Jun. 24, 2014.

Extended European Search Report for Application No. 14774359.5-1809 dated Dec. 9, 2016.

* cited by examiner

BRUSHLESS WIPER MOTOR

CROSS REFERENCE TO RELATED APPLICATION

Applicant hereby claims foreign priority benefits under U.S.C. § 119 from International Patent Application Serial No. PCT/JP2014/058655 filed on Mar. 26, 2014 and Japanese Patent Application No. 2013-072537 filed on Mar. 29, 2013, the contents of which are incorporated by reference herein.

TECHNICAL FIELD

The present invention relates to a brushless wiper motor which drives a wiper member provided on a windshield for swinging.

BACKGROUND ART

Conventionally, a wiper apparatus is mounted on a vehicle such as automotive vehicle to wipe out rainwater, dust, and the like on a windshield. The wiper apparatus includes a wiper member provided on the windshield and a wiper motor for driving the wiper member for rotation. The wiper motor is driven for rotation with an ON operation of a wiper switch provided in the interior of the vehicle by an operator. Therefore, the wiper member is configured to make a swinging motion on the windshield to wipe out extraneous material.

One example of the wiper motor as described above is disclosed in Japanese Patent Application Laid-Open Publication No. 2010-093977 (FIG. 3). A wiper motor (decelerating-mechanism-equipped wiper motor) described in Japanese Patent Application Laid-Open Publication No. 2010-093977 (FIG. 3) includes a motor part and a decelerating part. The motor part includes a yoke housing made of metal, and a stator having a winding is fixed inside the yoke housing. Furthermore, a rotor is rotatably disposed inside the stator. That is, the motor part of the wiper motor described in Japanese Patent Application Laid-Open Publication No. 2010-093977 (FIG. 3) serves as a brushless motor.

On the other hand, the decelerating part includes a gear housing made of aluminium, a worm portion provided on a rotating shaft of the rotor, and a worm wheel engaged with the worm portion are accommodated in the gear housing. The worm portion and the worm wheel collectively form a decelerating mechanism, the decelerating mechanism is configured to decelerate the rotation of the rotating shaft to increase torque, and the torque-increased rotation is outputted from an output shaft fixed to the worm wheel to the outside.

SUMMARY

Meanwhile, since the wiper motor is mounted on vehicles of various sizes from light vehicles to large vehicles, small size and light weight are desired to improve its versatility. Also, since various electronic devices are mounted on a vehicle or the like, it is desired to suppress electromagnetic noise to be generated at the time of actuation of the wiper motor as much as possible. Thus, as the wiper motor described in Japanese Patent Application Laid-Open Publication No. 2010-093977 (FIG. 3) described above, a brushless motor has been adopted as a motor part.

However, according to the above-described wiper motor (brushless wiper motor) described in Japanese Patent Application Laid-Open Publication No. 2010-093977 (FIG. 3), since the yoke housing made of metal and the gear housing made of aluminium are coupled to each other, part of heat transmitted to the yoke housing is transmitted to the gear housing and is dissipated outside via the gear housing. That is, in the above-described brushless wiper motor described in Japanese Patent Application Laid-Open Publication No. 2010-093977 (FIG. 3), there is a need for improvement in more efficient dissipation of heat transmitted to the yoke housing to the outside.

By allowing heat transmitted to the yoke housing to be efficiently dissipated outside, it is possible to enhance heat-resistance strength of the brushless wiper motor, as a result, it is possible to perform stable continuous operation over a long period of time, while filling needs for reduction in size and weight of the brushless wiper motor, and suppression of electromagnetic noise.

An object of the present invention is to provide a brushless wiper motor which can be improved in size and weight, suppressed in electromagnetic noise, and enhanced in heat-resistance strength.

In accordance with one aspect of the present invention, there is provided a brushless wiper motor which drives a wiper member for swinging, comprising: a motor case in which a stationary portion is fixed; a rotary portion rotatably provided in the stationary portion; a gear mechanism which transmits rotation of the rotary portion to the wiper member; and a gear case in which the gear mechanism is accommodated, wherein the motor case and the gear case are made of aluminium.

In accordance with another aspect of the present invention, the motor case is provided with a shaft-bearing mounting portion on which a shaft-bearing member is mounted, the shaft-bearing member rotatably supports one side of a rotating shaft in an axial direction, the rotating shaft being provided to a shaft center of the rotary portion.

In accordance with still another aspect of the present invention, the gear case is closed with a cover member made of aluminium, wherein a control board for controlling the rotation of the rotary portion is mounted on the gear cover.

In accordance with yet another aspect of the present invention, an concave-convex portion which increases a surface area of the motor case is formed on at least one of an inner circumferential surface and an outer circumferential surface of the motor case.

According to the present invention, since the motor case in which the stationary portion is fixed, and the gear case in which the gear mechanism is accommodated are made of aluminium, most heat generated from the stationary portion at the time of actuation of the brushless wiper motor can be directly dissipated outside from the motor case. That is, compared with conventional technique, heat transmitted to the motor case can be efficiently dissipated outside, and the motor case does not reach high temperature. Therefore, as a matter of course, reduction in size and weight can be achieved, suppression of electromagnetic noise can be achieved, and heat-resistance strength can be enhanced. Expensive components capable of resisting high temperatures are not required, and reduction in manufacturing cost can be achieved.

DETAILED DESCRIPTION

[First Embodiment]

Hereinafter, a first embodiment of the present invention will be described in detail with reference to the drawings.

Figure 1:
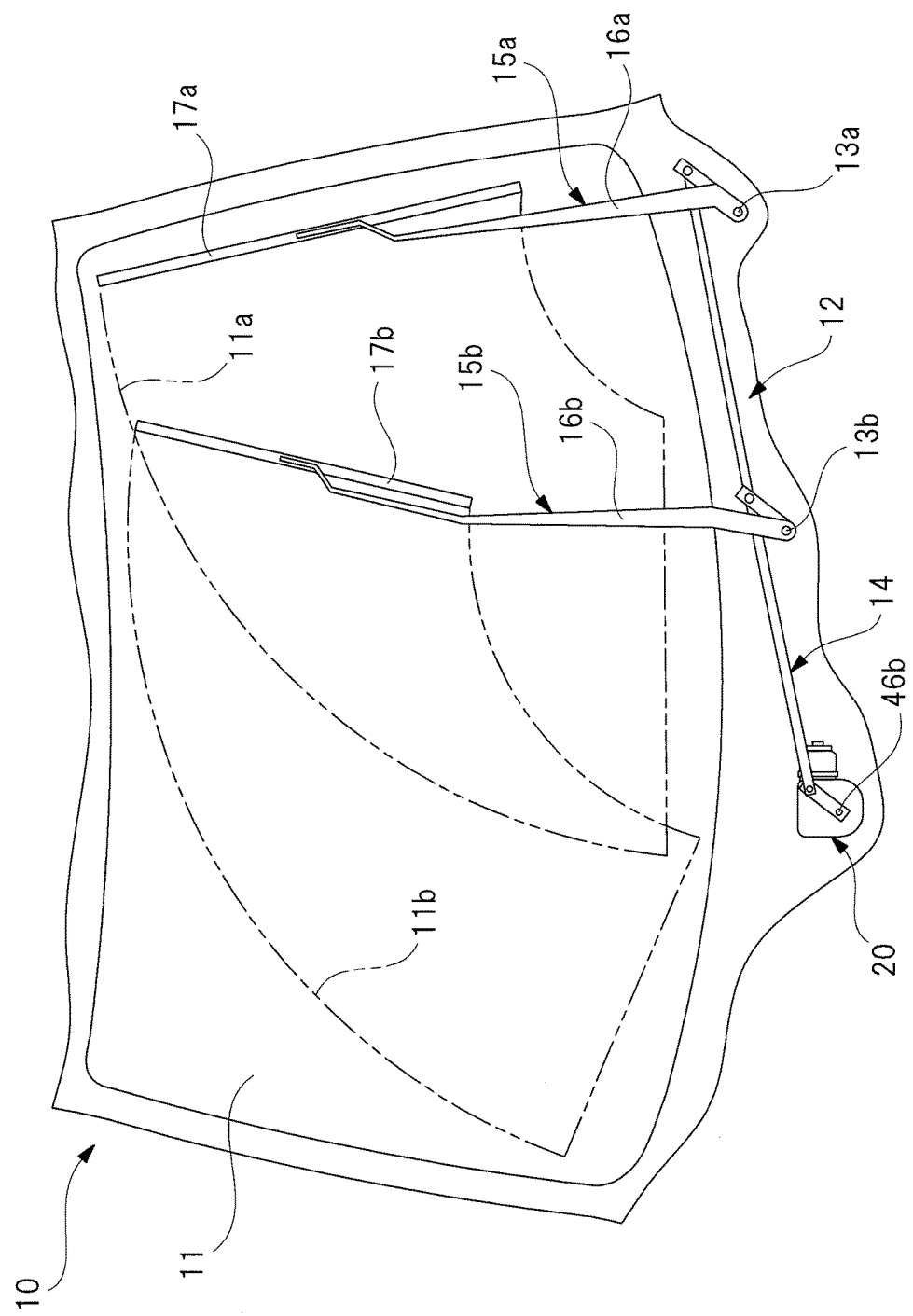
FIG. 1 is a view showing a vehicle-mounted wiper apparatus including a brushless wiper motor according to the present invention.
Figure 2:
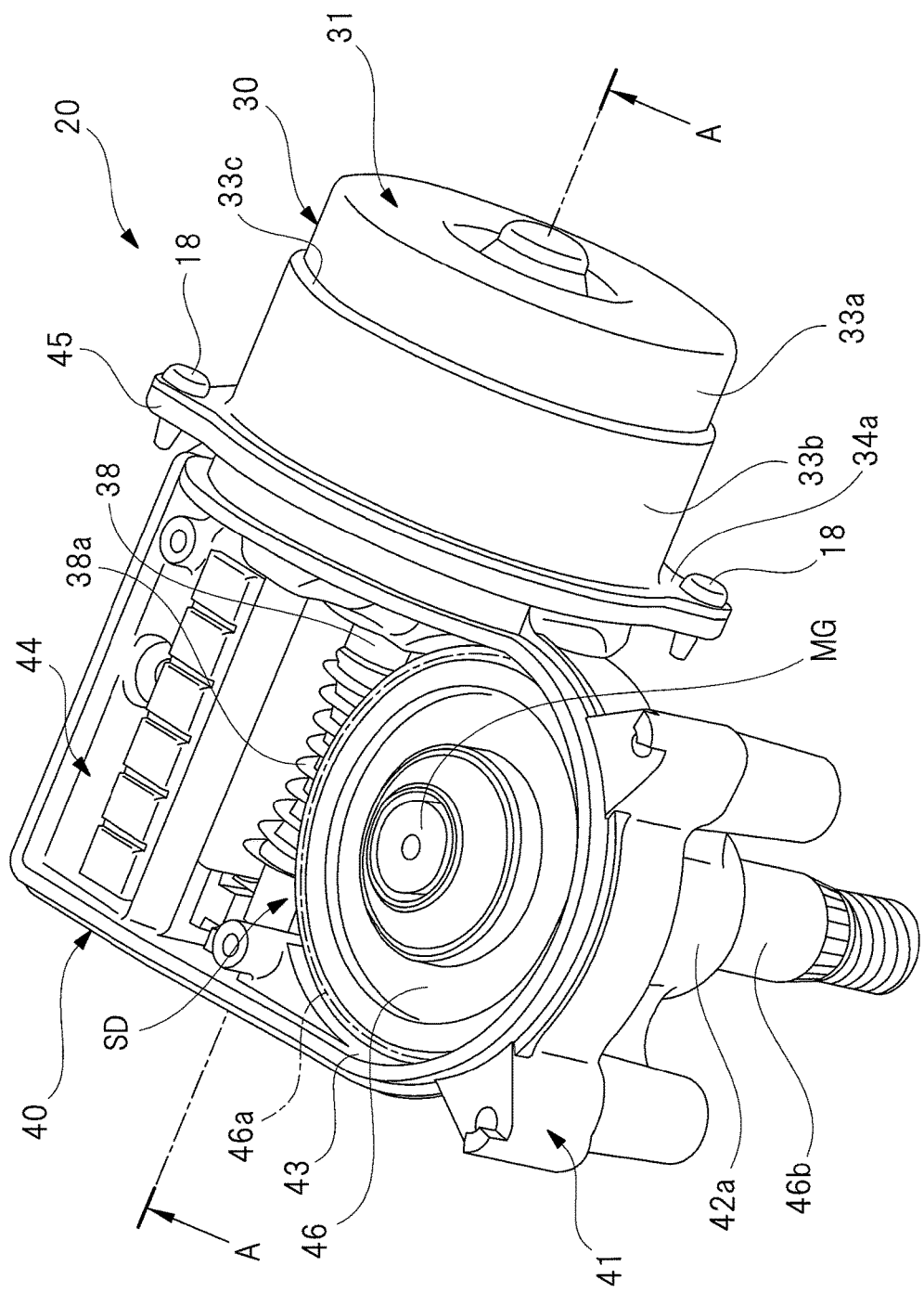
FIG. 2 is a perspective view showing an outer appearance of the brushless wiper motor (without a gear cover) of a first embodiment.
Figure 3:
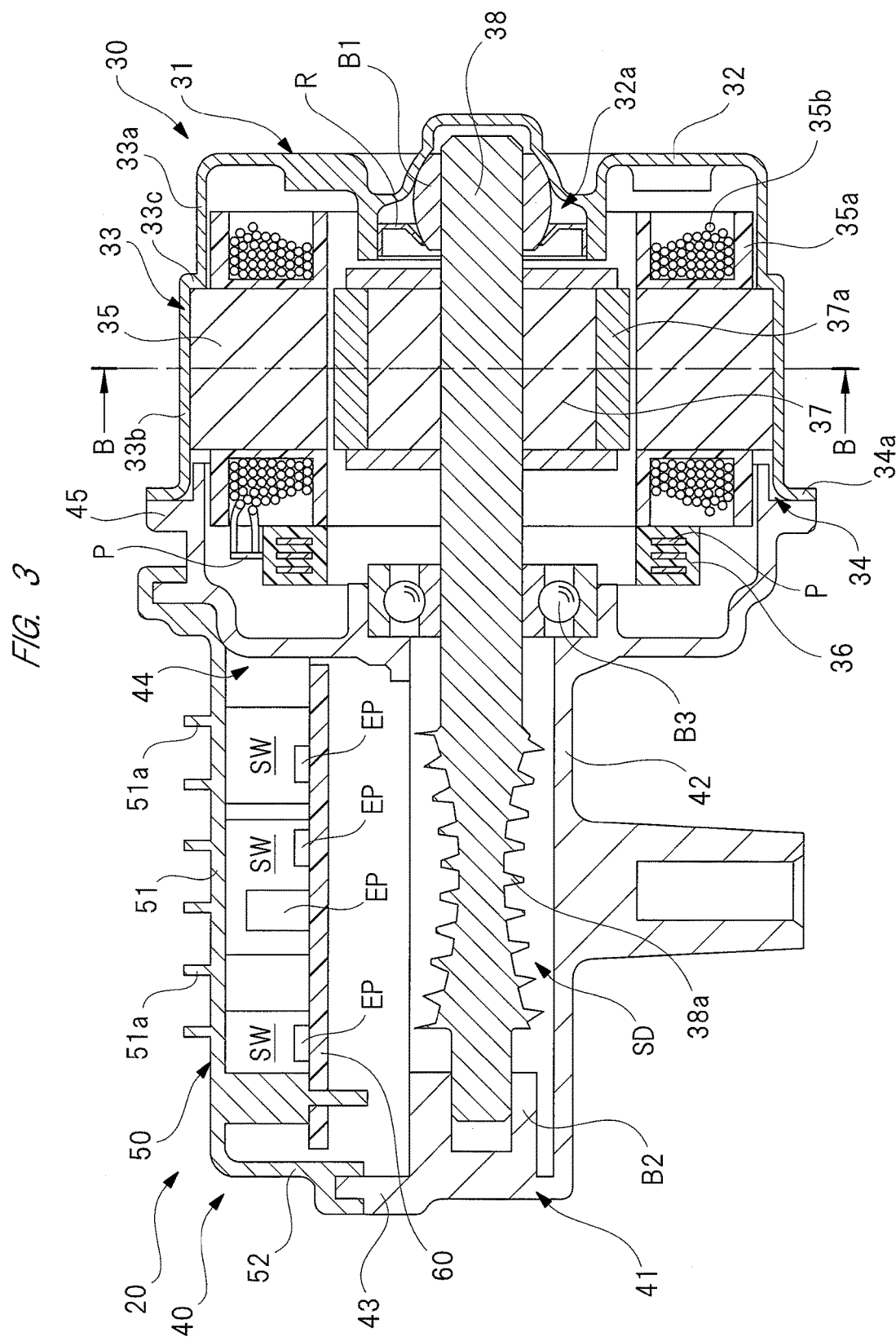
FIG. 3 is a sectional view (with the gear cover) taken along an A-A line of FIG. 2.
Figure 4:
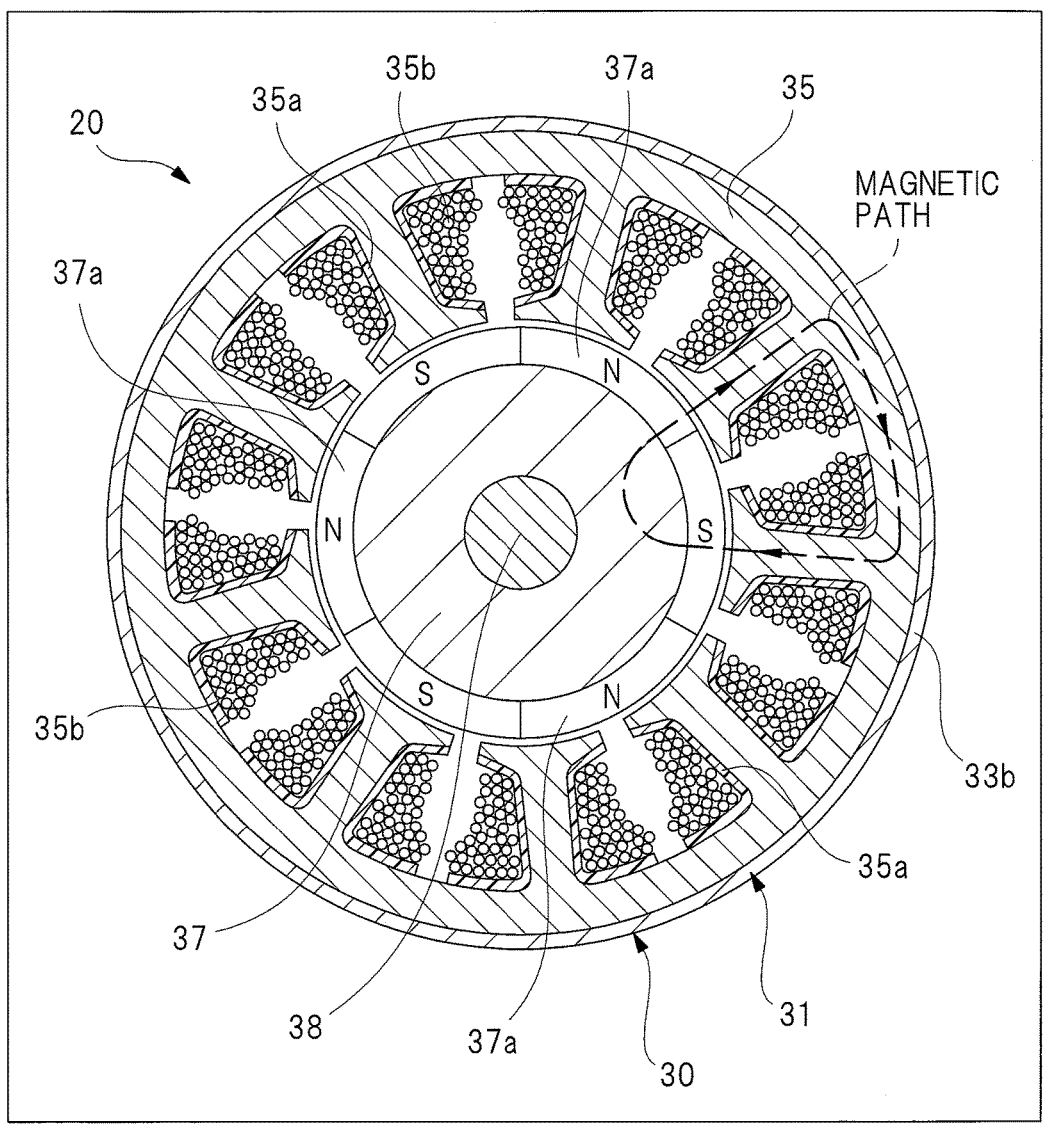
FIG. 4 is a sectional view taken along a B-B line of FIG. 3.
Figure 5:
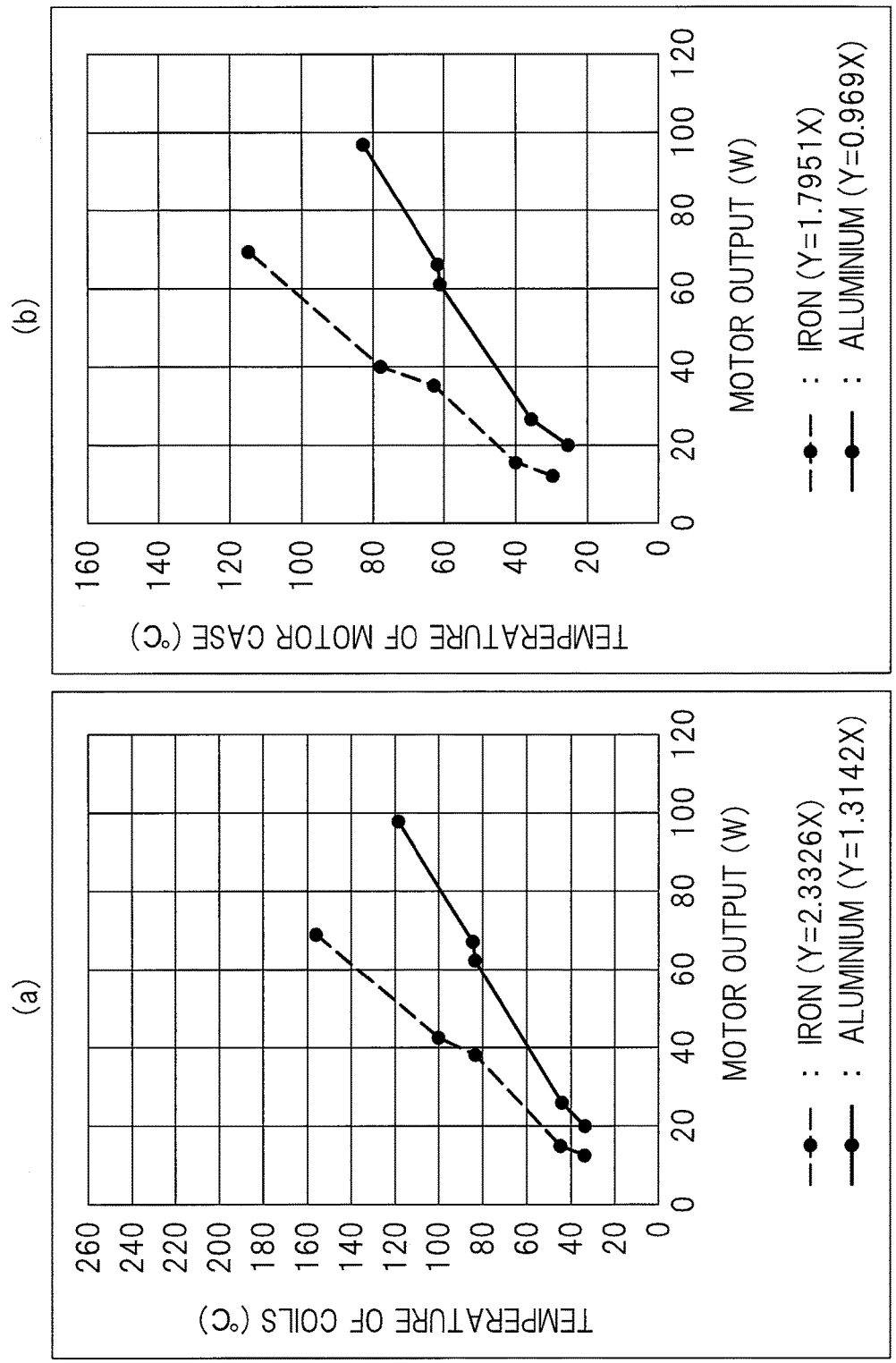
FIGS. 5(a) and 5(b) are graphs respectively showing temperature of coil and temperature of case on the basis of a difference in material (iron/aluminium) of a motor case.

FIG. 1 is a views showing a vehicle-mounted wiper apparatus including a brushless wiper motor according to the present invention, FIG. 2 is a perspective view showing an outer appearance of the brushless wiper motor (without a gear cover) of FIG. 1, FIG. 3 is a sectional view (with the gear cover) taken along an A-A line of FIG. 2, FIG. 4 is a sectional view taken along a B-B line of FIG. 3, and FIGS. 5(a) and 5(b) are graphs respectively showing temperature of coil and temperature of case on the basis of a difference in material (iron/aluminium) of a motor case.

As shown in FIG. 1, a vehicle 10 such as automotive vehicle is provided with a front glass (windshield) 11, a wiper apparatus 12 is mounted on a front end portion of the front glass 11 in the vehicle 10, and the wiper apparatus 12 is driven in response to an ON operation on a wiper switch (not depicted) provided in the interior of the vehicle. Therefore, rainwater, dust, and other extraneous material on the front glass 11 are wiped out.

The wiper apparatus 12 includes a brushless wiper motor 20, a power transmission mechanism 14 for transmitting a swinging motion of the brushless wiper motor 20 to each of pivot shafts 13a and 13b, and a pair of wiper members 15a and 15b whose base ends are respectively fixed to the pivot shafts 13a and 13b, and whose tip ends perform a reciprocating wiping-out operation on the front glass 11 by swinging motions of the pivot shafts 13a and 13b. The wiper members 15a and 15b are respectively provided so as to correspond to a driving seat side and a passenger seat side, and the wiper members 15a and 15b are respectively composed of wiper arms 16a and 16b, and wiper blades 17a and 17b attached to the wiper arms 16a and 16b.

When the brushless wiper motor 20 is driven for rotation, the swinging motion of the brushless wiper motor 20 is transmitted to each of the pivot shafts 13a and 13b via the power transmission mechanism 14, thereby driving each of the pivot shafts 13a and 13b for swinging. In this manner, the driving force of the brushless wiper motor 20 is transmitted to each of the wiper members 15a and 15b, and extraneous materials attached within the wiping ranges 11a and 11b of the front glass 11 are wiped out by the wiper blades 17a and 17b.

As shown in FIGS. 2 to 4, the brushless wiper motor 20 includes a motor part 30 and a gear unit 40, and the motor part 30 and the gear unit 40 are coupled to each other without a gap with a pair of fastening screws 18.

The motor part 30 includes a motor case 31 made of aluminium. The motor case 31 is formed into a bottomed cylindrical shape by deep-drawing process on an aluminium-made plate member, and has a bottom portion 32, a side wall portion 33, and an opening 34. Inside the motor case 31, a bearing mounting portion (shaft-bearing mounting portion) 32a on which a first bearing (shaft-bearing member) B1 for rotatably supporting one side of a rotating shaft 38 in an axial direction is mounted, is formed at a shaft center of the bottom portion 32. The bearing mounting portion 32a is formed into a bottomed cylindrical shape. By mounting the first bearing B1 in the bearing mounting portion 32a and mounting a retaining ring R in the bearing mounting portion 32a, the first bearing B1 is fixed to the bearing mounting portion 32a.

The side wall portion 33 includes a small diameter portion 33a and a large diameter portion 33b. The small diameter portion 33a is disposed on the same side of the motor case 31 as a bottom portion 32 along an axial direction, and the large diameter portion 33b is disposed on the same side of the motor case 31 as an opening 34 along the axial direction. A step portion 33c is formed between the small diameter portion 33a and the large diameter portion 33b, and a flange portion 34a is formed on the same side of the large diameter portion 33b as an opening 34.

One end of a stator 35 in an axial direction abuts on the step portion 33c, and the step portion 33c positions the stator 35 with respect to the axial direction of the motor case 31. Furthermore, the flange portion 34a abuts on a butt flange 45 of a gear case 41 to cause each of the fastening screws 18 to extend so as to penetrate them.

The stator 35 as a stationary portion is fixed in the motor case 31. The stator 35 is formed into a substantially cylindrical shape by laminating steel plates (not shown) which are a plurality of magnetic bodies, and the stator 35 has an outer circumferential portion in contact with the motor case 31 without a gap. Therefore, heat accumulated in the stator 35 can be efficiently transmitted to the motor case 31.

A resin-made coil bobbin 35a is an insulator, and disposed around the periphery of the stator 35. In addition, coils 35b (not shown in detail) in "U-phase", "V-phase", and "W-phase" (three phases) are wound around the coil bobbin 35a.

A bus bar unit 36 made of resin is disposed on the other side of the stator 35 in an axial direction. The bus bar unit 36 is formed into an annular shape, and a plurality of conductive plates "P" (not shown in detail) formed into a substantially arc shape by press processing on a steel plate are buried in the bus bar unit 36 by insert molding. In addition, an end of each coil 35b is electrically connected to one end of each conductive plate "P" so as to form a winding of a star connection (Y-connection). Here, a method of connecting each coil 35b is not restricted to the star connection as described above, and may be another connecting method such as delta connection (triangular connection).

On the other hand, three switching elements SW (corresponding to the U-phase, the V-phase, and the W-phase) mounted on a control board 60 housed in the gear cover 50 are electrically connected to the other end of each conductive plate "P". That is, the bus bar unit 36 collects ends of the coils 35b, have a function as a current collector, and configured to electrically connect each coil 35b to the control board 60.

Inside the stator 35, a rotor 37 as a rotary portion is rotatably provided via a predetermined gap (air gap). The rotor 37 is formed into a substantially columnar shape by laminating a plurality of steel plates (not shown) which are magnetic material. As shown in FIGS. 3 and 4, a plurality of permanent magnets 37a (six poles in this embodiment) each having a substantially arc shape in cross section are attached to a front surface of the rotor 37.

The permanent magnets 37a are disposed equidistantly (spaced at 60 degrees) so that the poles are alternately arranged along a circumferential direction of the rotor 37. As described above, a brushless motor having an SPM (Surface Permanent Magnet) structure having the plurality of permanent magnets 37a attached to the front surface of the rotor 37 is adopted in the brushless wiper motor 20. However, the present invention motor is not limited to the brushless motor having the SPM structure, and may be applied to a brushless motor having an IPM (Interior Permanent Magnet) structure with a plurality of permanent magnets buried in the rotor 37.

The shaft center of the rotor 37 has the rotating shaft 38 penetrating and fixed thereto. One side (right side in FIG. 3) of the rotating shaft 38 in an axial direction is rotatably supported by the first bearing B1 mounted on the bearing mounting portion 32a of the motor case 32. Here, the first bearing B1 is formed of for example a sintered metal subjected to oil bearing process, and brought into contact with both the rotating shaft 38 and the motor case 31. Therefore, heat accumulated in the rotating shaft 38 is efficiently transmitted to the motor case 31 via the first bearing B1.

On the other hand, the other side (left side in FIG. 3) of the rotating shaft 38 extends to the inside of the gear case 41 forming part of the gear portion 40. An extended portion of the rotating shaft 38 to the inside of the gear case 41, that is, a portion of the rotating shaft 38 on the other side in the axial direction positioned in the gear case 41, and a substantially center portion thereof are rotatably supported by paired second and third bearings B2 and B3 provided to the gear case 41. Here, in particular, the second bearing B2 forms part of the gear case 41, that is, the other side of the rotating shaft 38 in the axial direction is rotatably supported directly by the gear case 41. Therefore, heat accumulated in the rotating shaft 38 is efficiently transmitted to the motor case 31.

Furthermore, a worm 38a forming part of a decelerating mechanism (gear mechanism) SD is integrally provided on the other side of the rotating shaft 38 in the axial direction, and between the bearings B2 and B3. Here, a substantially center portion of the worm 38a along an axial direction is smaller in diameter than both end portions of the worm 38a in the axial direction (constricted shape), thereby achieving reduction in diameter of the worm wheel 46, that is, reduction in size and weight of the brushless wiper motor 20, while ensuring engaging strength with a worm wheel 46 (refer to FIG. 2).

The gear portion 40 includes the gear case 41 made of aluminium. The gear case 41 is formed into a substantially bath-tub bottomed shape by pouring a molten aluminium material into a mold, and has a bottom portion 42, a side wall portion 43, and an opening 44.

The butt flange 45 is provided on the same side of the gear case 41 as a motor part 30, faces the flange portion 34a of the motor case 31, and abuts on the flange portion 34a. Here, the flange portion 34a and the butt flange 45 are coupled to each other without a gap via the fastening screws 18, and heat accumulated in the stator 35 and others can easily come and go between them. That is, heat inside the brushless wiper motor 20 can be easily dissipated outside.

Here, since the motor case 31 and the gear case 41 are made of aluminium, their linear expansion coefficients are the same as each other. Therefore, even if temperature of use environment is changed, or heat is generated by the brushless wiper motor 20 due to long period of operation, a gap is not formed between the motor case 31 and the gear case 41. That is, sealing performance between them is not decreased due to temperature change.

As shown in FIG. 2, the worm wheel 46 is rotatably accommodated in the gear case 41. The worm wheel 46 is formed into a substantially disk shape made of resin material such as for example POM (polyacetal) plastic, and gear teeth 46a (not shown in detail) are formed on its outer circumferential portion. The worm 38a is engaged with the gear teeth 46a of the worm wheel 46, and the worm wheel 46 and the worm 38a collectively constitute the decelerating mechanism SD accommodated in the gear case 41.

A base end of an output shaft 46b is fixed to a shaft center of the worm wheel 46, and the output shaft 46b is rotatably supported via a shaft bearing (not shown), to a boss portion 42a integrally provided to the bottom portion 42 of the gear case 41. A tip end side of the output shaft 46b extends outside the gear case 41, and the power transmission mechanism 14 (refer to FIG. 1) is fixed to a tip end portion of the output shaft 46b.

In this manner, the rotation number of the rotating shaft is decelerated by the worm 38a and the worm wheel 46 (decelerating mechanism SD), and the output decelerated so as to have a high torque is transmitted to the power transmission mechanism 14 via the output shaft 46b, thereby driving each of the wiper members 15a and 15b for swinging.

A sensor magnet MG formed into a substantially disk shape is mounted on the shaft center of the worm wheel 46, and on the opposite side from the output shaft 46b. The sensor magnet MG is magnetized in two poles along its circumferential direction. That is, one 180-degree range of the sensor magnet MG is magnetized in the S-pole, and the other 180-degree range is magnetized in the N-pole. Here, the sensor magnet MG is used to detect a rotation position of the output shaft 46b with respect to the gear case 41.

As shown in FIG. 3, the opening 44 of the gear case 41 is closed with a gear cover (cover member) 50 made of aluminium. The gear cover 50 includes a bottom portion 51 and aside wall portion 52, and the bottom portion 51 is provided with a plurality of cooling fins 51a for improving cooling efficiency by widening the surface area of the bottom portion 51. Here, the gear case 41 and the gear cover 50 are coupled to each other without a gap via a plurality of fastening screws (not shown), and heat accumulated in the control board 60 and others can easily come and go between them. That is, heat inside the brushless wiper motor 20 can be easily dissipated outside.

In this embodiment, since the gear cover 50 and the gear case 41 are made of aluminium, they are the same as each other in linear expansion coefficient. Therefore, even if the temperature of the use environment is changed, or heat are generated in the brushless wiper motor 20 due to long period of operation, a gap is not formed between the gear cover 50 and the gear case 41. That is, sealing performance between them is not decreased with temperature change.

The control board 60 for controlling the rotation of the rotor 37 is housed in the gear cover 50. A vehicle-mounted battery (not shown) and the wiper switch are electrically connected to the control board 60 via an external connector (not shown) on a vehicle 10 which is connected to a connector connecting portion (not shown) provided to the gear cover 50.

The control board 60 is provided in the gear case 41 and the gear cover 50, and three switching elements SW and another electronic components EP are mounted on the control board 60. In particular, switching elements SW each of which is a heating element is brought into contact with the inside of the gear cover 50 without a gap. In this manner, heat of each switching element SW can be efficiently dissipated outside.

The coils 35b composed of the U-phase, the V-phase, and the W-phase is electrically connected to each switching element SW via the bus bar unit 36. In addition, each switching element SW is formed with a semiconductor element such as a FET, and more specifically formed with: a positive-side semiconductor element (not shown) that is connected to the positive pole of the vehicle battery, and a negative-side semiconductor element (not shown) that is connected to the negative pole of the vehicle battery.

A sensor element facing the sensor magnet MG mounted on the shaft center of the worm wheel 46 and a CPU (both not shown) are further mounted on the control board 60. Here, as one example of this sensor element, a Hall sensor (Hall IC) which detects a magnetic field is used, and the sensor element is configured to generate a pulse signal (electrical signal) with a predetermined phase difference in accordance with the rotation of the sensor magnet MG.

And, by monitoring the pulse signal from the sensor element, the CPU detects the position of each of the wiper blades 17a and 17b (refer to FIG. 1) with respect to the front glass 11, and also controls ON/OFF of each switching element SW to drive the brushless wiper motor 20. In this manner, each of the wiper blades 17a and 17b can be stopped at a predetermined position on the front glass 11, or caused to perform a reverse operation.

Next, the operation and temperature change of the brushless wiper motor 20 will be described in detail with reference to the drawings.

When the switching elements SW are respectively sequentially subjected to ON/OFF control by the CPU mounted on the control board 60, a magnetic path shown by dotted arrows in FIG. 4 is sequentially switched along a circumferential direction of the motor case 31. In this manner, electromagnetic forces sequentially generated in the respective coils 35b in the circumferential direction of the motor case 31, and as a result, the rotor 37 having the permanent magnets 37a mounted thereon is driven in a predetermined rotating direction at a predetermined rotation speed.

And as shown in FIG. 5(a), for example, when rotation driving is performed for two hours (for a long period of time) with a motor output set at 60 W (high-speed driving), the temperature of the coils 35b is approximately 83 degrees Celsius in the brushless wiper motor 20 with the motor case 31 made of aluminium ($y=1.3142x$: solid line), that is, in the present invention. In contrast, when a wiper motor (comparative example) with a motor case (not shown) and made of iron ($y=2.3326x$: broken line) is driven for rotation with the same conditions, the temperature of the coils is approximately 139 degrees Celsius. This means that, since the motor case 31 is the same in material as the gear case 41, heat dissipation of the brushless wiper motor 20 is markedly improved with the motor case 31 made of aluminium.

In addition, it was found that, similarly to the temperature changes of the coils 35b, the temperature of the motor case 31 is changed as shown in FIG. 5(b). That is, in the brushless wiper motor 20 with the motor case 31 made of aluminium ($y=0.969x$: solid line), the temperature of the motor case 31 is approximately 62 degrees Celsius. On the other hand, in a wiper motor with a motor case made of iron ($y=1.7951x$: broken line), the temperature of the motor case is approximately 103 degrees Celsius.

As described in detail above, according to the brushless wiper motor 20 of the first embodiment, since both the motor case 31 in which the stator 35 is fixed, and the gear case 41 in which the decelerating mechanism SD is accommodated are made of aluminium, most heat generated by the stator 35 at the time of actuation of the brushless wiper motor 20 can be directly dissipated outside from the motor case 31. That is, compared with conventional technique, heat transmitted to the motor case 31 can be efficiently dissipated outside, and the motor case 31 does not reach a high temperature. Therefore, as a matter of course, size and weight can be reduced, suppression of electromagnetic noise can be achieved, and heat-resistance strength can be enhanced. Expensive components capable of resisting high temperatures are not required, and reduction in manufacturing cost can be achieved.

[Second Embodiment]

Next, a second embodiment of the present invention will be described in detail with reference to the drawings. Note that parts of the second embodiment the same in function as those of the first embodiment are denoted by the same reference numbers, and the detail descriptions thereof are omitted here.

Figure 6:
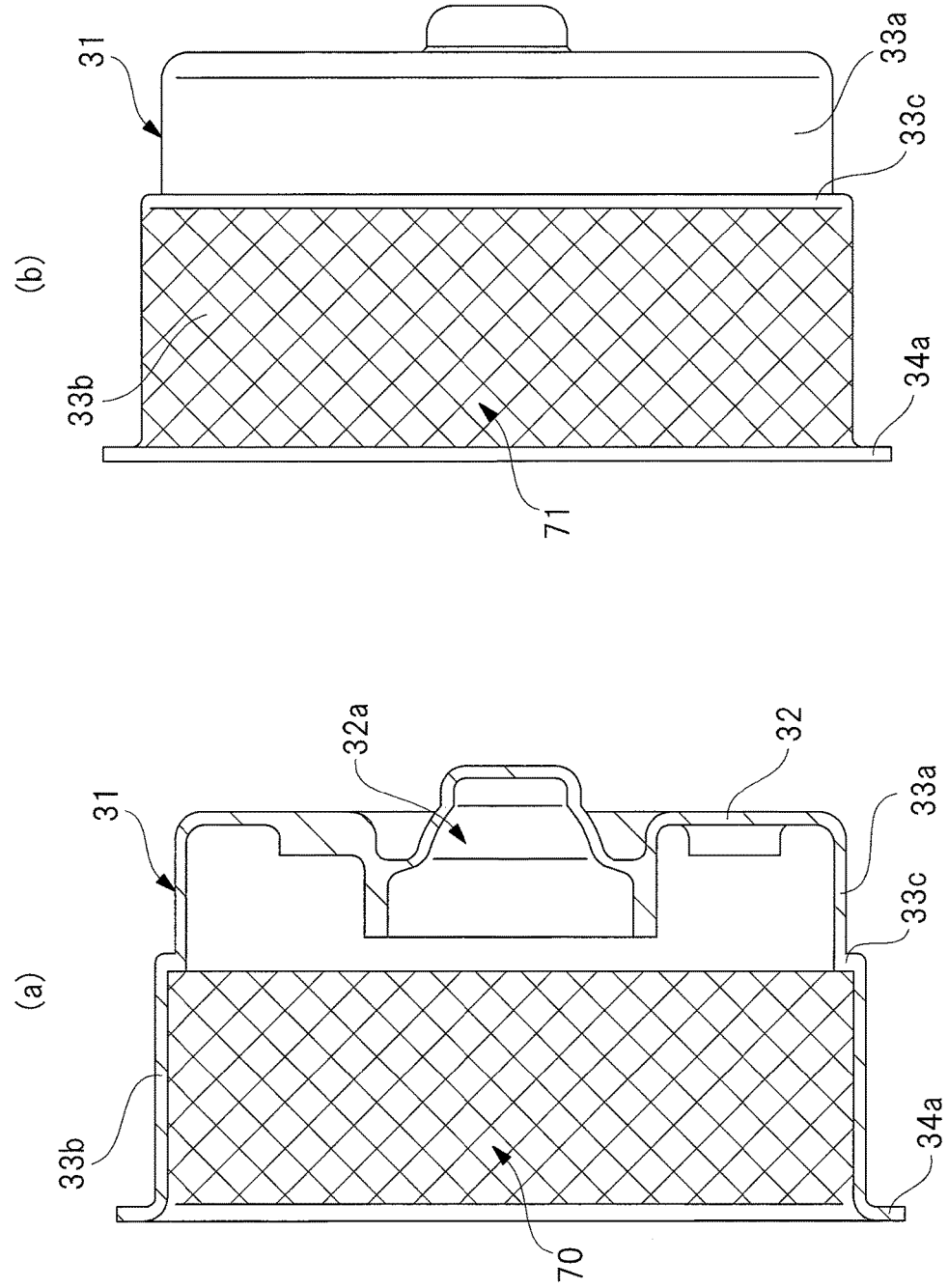
FIGS. 6(a) and 6(b) are views showing a general outline of a motor case of a second embodiment.
Figure 7:
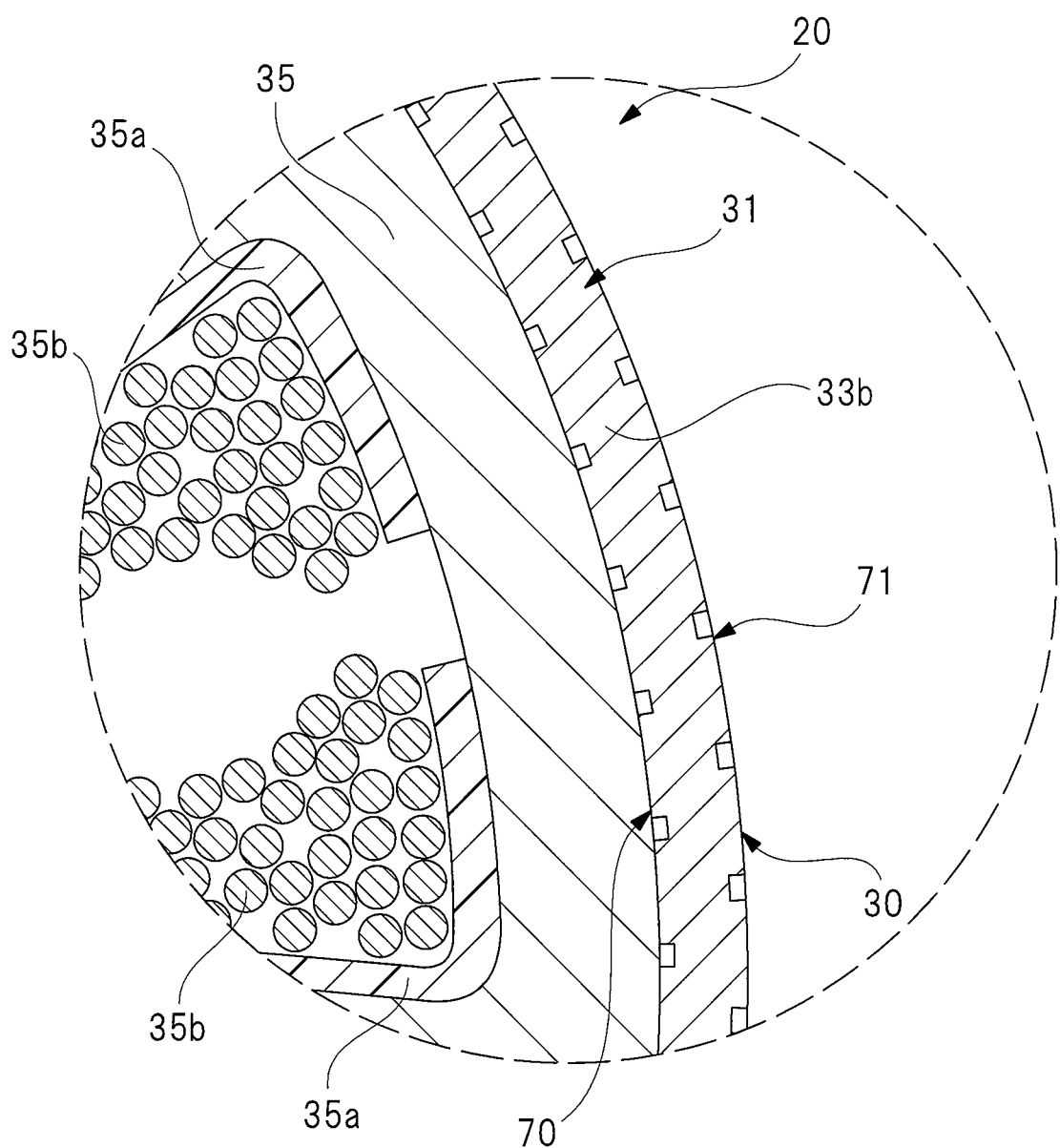
FIG. 7 is a partially-enlarged sectional view showing details of concave-convex portions of the motor case of FIG. 6.

FIGS. 6(a)-6(b) are views showing a general outline of a motor case of the second embodiment, and FIG. 7 is a partially-enlarged sectional view showing details of concave-convex portions of the motor case of FIGS. 6(a)-6(b).

As shown in hatched portions of FIGS. 6(a)-6(b) and in FIG. 7, the second embodiment is different from the first embodiment in that in order to increase the surface area of the motor case 31, concave-convex portions 70 and 71 are provided to both an inner circumferential surface and an outer circumferential surface of the motor case 31. Specifically, the concave-convex portions 70 and 71 are formed by performing "graining process" on each of the inner circumferential surface and the outer circumferential surface of the large diameter portion 33b in the motor case 31. Here, "graining process" is a processing technology of transferring fine asperities provided on the front surface of a mold (press mold) onto the inner circumferential surface and the outer circumferential surface of the large diameter portion 33b when deep drawing process (press processing) is performed on the motor case 31.

However, this processing technique is not restricted to "graining process", and another processing technique may be adopted as long as the technology can forma concave-convex portion on the front surface of the large diameter portion 33b. Also, like the plurality of cooling fins 51a (refer to FIG. 3) provided to the bottom portion 51 of the gear case 50, a plurality of cooling fins as a concave-convex portion may be provided to the outer circumferential surface of the large diameter portion 33b.

Also in the above second embodiment, operations and effects the same as those of the first embodiment can be achieved. In addition, in the second embodiment, since the concave-convex portions 70 and 71 are respectively provided to the inner circumferential surface and the outer circumferential surface of the large diameter portion 33b in the motor case 31, the surface area of the motor case 31 can be increased. Therefore, heat transmitted to the motor case 31 can be more efficiently dissipated outside. As a result, heat-resistance strength can be enhanced.

Furthermore, with the concave-convex portion 70 formed on the inner circumferential surface of the large diameter portion 33b, the concave-convex portion 70 achieves an "anchor effect" when the stator 35 and the large diameter portion 33b are bonded to each other with a bonding agent (not shown). Therefore, bonding strength between the stator 35 and the large diameter portion 33b can be improved.

Furthermore, with the concave-convex portions 70 and 71 respectively provided to the inner circumferential surface and the outer circumferential surface of the large diameter portion 33b, the motor case 31 can be improved in stiffness. Therefore, the motor case 31 can be reduced in weight by making the plate thickness of the motor case 31 thinner.

In addition, the concave-convex portions 70 and 71 are respectively provided to the inner circumferential surface and the outer circumferential surface of the large diameter portion 33b as described above, but they are not restricted to this example. Only the concave-convex portion 71 may be provided to the outer circumferential surface of the large diameter portion 33b. In this case, improvement in heat dissipation capability of the motor case 31 is prioritized in design phase. On the other hand, conversely to this, only the concave-convex portion 70 may be provided to the inner circumferential surface of the large diameter portion 33b. In this case, improvement in bonding strength between the stator 35 and the large diameter portion 33b is prioritized in design phase.

Furthermore, the concave-convex portions 70 and 71 are provided only to the large diameter 33b as described above, but they are not restricted to this example. They may be formed on the small diameter portion 33a, or formed on the bottom portion 32.

The present invention is not restricted to each of the above-described embodiments, and it goes without saying that the present invention can be variously changed without departing from the scope of the invention. For example, the motor case 31 made of aluminium is formed into a bottomed cylindrical shape by deep drawing process as described above, not restricted to this example. The motor case 31 maybe formed into a bottomed cylindrical shape by die casting (metal mold casting), or may be formed into a bottomed cylindrical shape by shaving (cutting).

Furthermore, in the above embodiments, the brushless wiper motor 20 is applied to a driving source of the wiper apparatus 12 for wiping the front glass 11 of the vehicle 10. However, the present invention is not restricted to this, and can be applied also to a driving source of a rear wiper apparatus of a vehicle or a driving source of a wiper apparatus of a railway vehicle, ship, construction equipment, or the like.

The brushless wiper motor is used to swing a wiper member forming part of a wiper apparatus to swing so as to wipe a windshield.

While the present disclosure has been illustrated and described with respect to a particular embodiment thereof, it should be appreciated by those of ordinary skill in the art that various modifications to this disclosure may be made without departing from the spirit and scope of the present disclosure.

What is claimed is:

1. A brushless wiper motor which drives and swings a wiper member, comprising:
    a motor case in which a stationary portion is fixed, the motor case having a bottom portion, a side wall portion, an opening, and a flange portion formed so as to extend from the opening, the motor case being formed of a plate material into a bottomed cylindrical shape by deep-drawing process, the stationary portion having an outer circumferential portion which is in contact with an inner periphery of the motor case;
    a rotary portion rotatably provided in the stationary portion;
    a gear mechanism which transmits rotation of the rotary portion to the wiper member; and
    a gear case in which the gear mechanism is accommodated, the flange portion abutting on the gear case and being fixed to the gear case, wherein
    the side wall portion has a small diameter portion and a large diameter portion which is different in outer diameter from the small diameter portion, the small diameter portion being disposed on the same side as the bottom portion of the motor case in an axial direction of the motor case, the large diameter portion being disposed on the same side as the opening of the motor case in the axial direction of the motor case,
    a step portion is formed between the small diameter portion and the large diameter portion, one end of the stationary portion in an axial direction thereof abutting on the step portion, a concave convex portion being provided to at least one of an inner circumferential surface and an outer circumferential surface of at least the large diameter portion, thereby increasing a surface area of the motor case,
    the motor case and the gear case are made of aluminium.

2. The brushless wiper motor according to claim 1, wherein
    the motor case is provided with a shaft-bearing mounting portion, a shaft-bearing member is mounted on the shaft-bearing mounting portion in a center of the bottom portion,
    the shaft-bearing member rotatably supports one side of a rotating shaft in an axial direction thereof, the rotating shaft being provided to a shaft center of the rotary portion.

3. The brushless wiper motor according to claim 1, wherein
    the gear case is closed with a cover member made of aluminium, wherein a control board for controlling the rotation of the rotary portion is mounted on the gear cover.

4. The brushless wiper motor according to claim 1, wherein
    the concave convex portion has concave and convex formed by a process of transferring fine asperities provided on a front surface of a mold for deep-drawing process.

* * * * *